(No Model.)
C. R. COLLINS.
CARBURETOR.
No. 497,866.          Patented May 23, 1893.
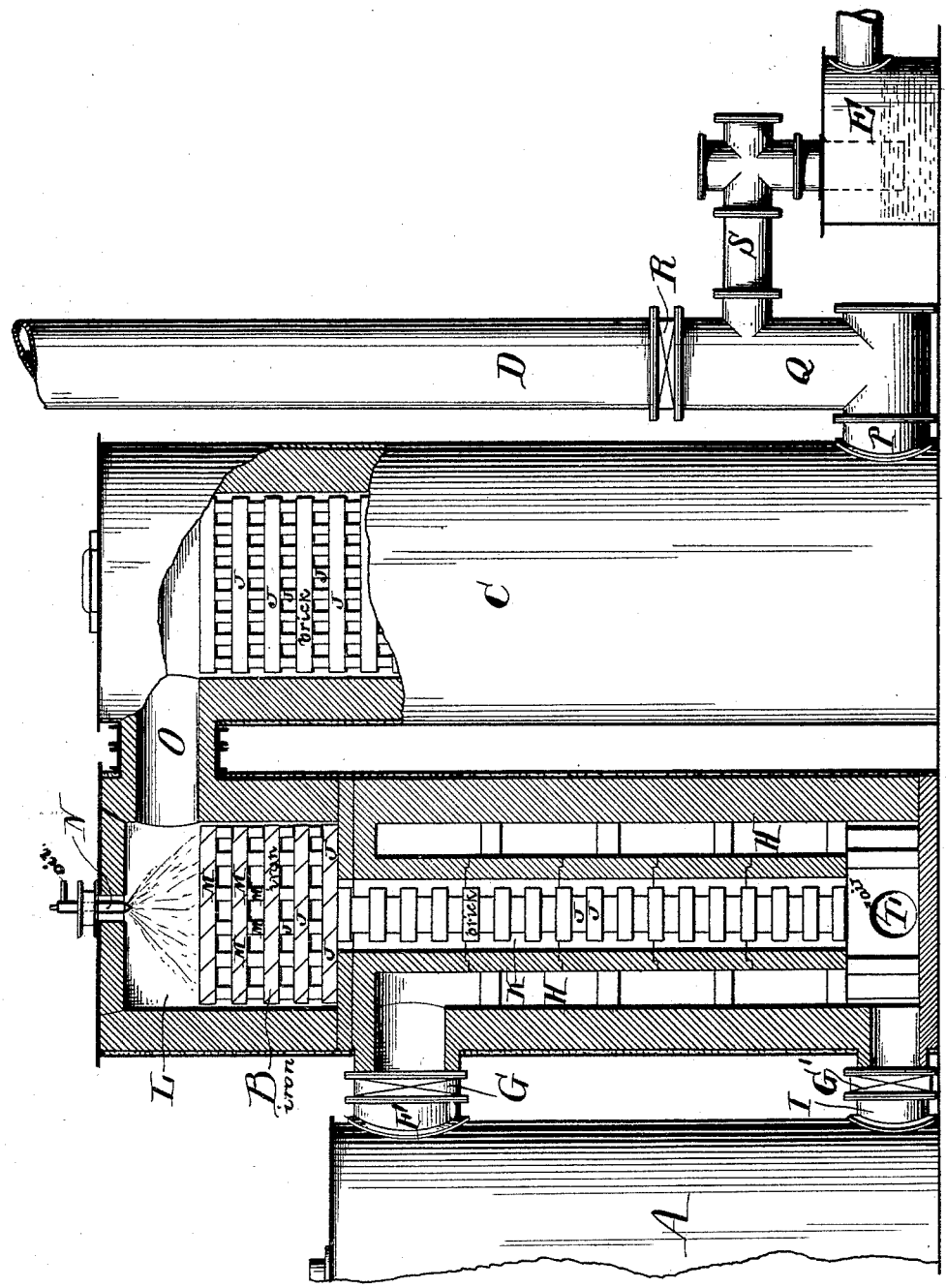

UNITED STATES PATENT OFFICE.

CHARLES RUSSELL COLLINS, OF PHILADELPHIA, PENNSYLVANIA, ASSIGNOR TO THE UNITED GAS IMPROVEMENT COMPANY, OF SAME PLACE.

CARBURETOR.

SPECIFICATION forming part of Letters Patent No. 497,866, dated May 23, 1893.

Application filed September 1, 1892. Serial No. 444,734. (No model.)

*To all whom it may concern:*

Be it known that I, CHARLES RUSSELL COLLINS, of the city and county of Philadelphia, State of Pennsylvania, have invented a certain new and useful Carburetor, of which the following is a true and exact description, reference being had to the accompanying drawing, which forms a part of this specification.

My invention relates to the construction of carburetors such as are used in water gas plants for enriching the water gas, and my object is to provide a carburetor of efficient and durable construction. This I accomplish by means of the devices hereinafter described in connection with the drawing which show my carburetor in central vertical section together with other parts of the gas making apparatus.

In the drawing A represents a gas generator, B the carburetor, C a fixing chamber, D the stack, E the washer for the gas. All these parts except the carburetor are of familiar construction and need not be further described, save to point out that a conduit F having a valve at G leads from the generator into an annular chamber H formed in the carburetor B around an interior chamber K open at the bottom and top as shown and filled with checker work J of the ordinary kind, that is, of brick.

I is a conduit opening into the bottom of the carburetor and leading from the generator, the conduit F being preferably used for the producer gas formed in blowing up, and the conduits I and F at will for the water gas.

G and G' indicate valves in conduits F and I, and I' is an air blast opening.

At the top of the chamber K is an enlarged chamber L also filled with checker work as shown at J and M, the upper layer M being of iron, and the depth of the iron checker work being such as will insure that no fluid oil will pass beyond it (in the construction shown below it) and come in contact with the brick checker work. This forms an important feature of my invention and makes my carburetor much more durable, as the oil when it comes in direct contact with the brick work has a disintegrating effect and rapidly destroys it.

N is the oil injector situated next to the iron checker work, O a conduit leading into the fixing chamber C also filled with checker work. P a conduit leading to the washer E through the pipe S or to the stack Q which is provided with a valve indicated at R.

In practice the generator is blown up, the valve G' being closed, the gases passing through conduit F into annular passage H serving to heat the walls of chamber K, and then being mixed with air from I' and ignited, it passes up through chambers K, L, conduit O, chamber C, conduit P and stack Q to the atmosphere. When water gas is being made valve G is closed and G' opened, or G' closed and G opened as may be desired, and the gas enters the carburetor through conduits I or F passing up through the heated checker work in chambers K and L, and the injector N at the same time throws a spray of oil down on the iron checker work which serves to vaporize it together with the action of the hot gas. The vapor and gas pass together to the fixing chamber C and thence to the washer, the valve R. being closed.

The advantage of the spiral construction of the carburetor with respect to the chambers H and K is not only that the entering gas serves to heat the interior chamber, but also that the gas conduit F can be and is made very short, and very little heat lost by radiation.

Having now described my invention, what I claim as new, and desire to secure by Letters Patent, is—

1. In a carburetor the combination with the shell of a carburetor an oil injector and a checker work filling consisting of a portion M formed of iron and situated in that part of the casing where the oil enters, and a portion J formed of brick situated at a distance from the oil entrance, substantially as specified, and whereby the brick checkerwork is preserved from the destructive action of the oil.

2. A carburetor B having in combination a central chamber K filled with checker work, an annular gas passage H formed around said chamber, a broadened chamber L situated above the chamber K and also filled with checker work, and an oil injector N at the top of chamber L.

C. RUSSELL COLLINS.

Witnesses:
CHAS. F. MYERS,
FRANCIS T. CHAMBERS.